(12) United States Patent
Dotzler et al.

(10) Patent No.: US 12,005,821 B2
(45) Date of Patent: Jun. 11, 2024

(54) CUSHIONING ROLLING AND VERTICAL SUSPENSION MOVEMENTS

(71) Applicant: GRAMMER AG, Ursensollen (DE)

(72) Inventors: Florian Dotzler, Hirschau (DE); Konstantin Krivenkov, Amberg (DE)

(73) Assignee: GRAMMER AG, Ursensollen (DE)

( * ) Notice: Subject to any disclaimer, the term of this patent is extended or adjusted under 35 U.S.C. 154(b) by 533 days.

(21) Appl. No.: 17/118,889

(22) Filed: Dec. 11, 2020

(65) Prior Publication Data

US 2021/0178945 A1 Jun. 17, 2021

(30) Foreign Application Priority Data

Dec. 13, 2019 (DE) .......................... 102019134237.6

(51) Int. Cl.
*B60N 2/00* (2006.01)
*B60N 2/50* (2006.01)
(Continued)

(52) U.S. Cl.
CPC ............. *B60N 2/525* (2013.01); *B60N 2/501* (2013.01); *B60N 2/502* (2013.01); *B60N 2/508* (2013.01); *B60N 2/39* (2013.01); *B60N 2/527* (2013.01)

(58) Field of Classification Search
CPC ........ B60N 2/525; B60N 2/502; B60N 2/508; B60N 2/56; B60N 2/52; B60N 2/527
See application file for complete search history.

(56) References Cited

U.S. PATENT DOCUMENTS 3,847,338 A 11/1974 Adams
4,095,770 A 6/1978 Long
(Continued)

FOREIGN PATENT DOCUMENTS

CN 104742771 7/2015
CN 204999557 1/2016
(Continued)

OTHER PUBLICATIONS

Official Action for U.S. Appl. No. 17/118,877, dated Jun. 23, 2021 6 pages Restriction Requirement.
(Continued)

*Primary Examiner* — Tan Le
(74) *Attorney, Agent, or Firm* — Sheridan Ross PC (57) ABSTRACT

Vehicle seat having a suspension unit or cushioning the rolling and vertical suspension movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a spring element support and a first fluid spring element and a second fluid spring element, wherein the first fluid spring element and the second fluid spring element are each connected to the vehicle seat lower part and to the spring element support which is rotatably connected about a second axis of rotation to the first scissor arm and rotatably connected about a third axis of rotation to the second scissor arm, wherein a fluid can be pumped between the first fluid spring element and the second fluid spring element by means of a pump unit, so that the vehicle seat upper part is substantially in a horizontal position.

14 Claims, 5 Drawing Sheets

(51) Int. Cl.
  *B60N 2/52* (2006.01)
  *B60N 2/39* (2006.01)

(56) References Cited

U.S. PATENT DOCUMENTS

| | | | |
|---|---|---|---|
| 4,645,169 A | | 2/1987 | Mischer |
| 4,856,763 A | | 8/1989 | Brodersen et al. |
| 5,169,112 A | * | 12/1992 | Boyles .................. B60N 2/507 248/421 |
| 5,251,864 A | | 10/1993 | Itou |
| 5,388,801 A | | 2/1995 | Edrich et al. |
| 5,735,509 A | | 4/1998 | Gryp et al. |
| 5,927,679 A | | 7/1999 | Hill |
| 5,954,400 A | | 9/1999 | Brodersen |
| 5,957,426 A | | 9/1999 | Brodersen |
| 5,975,508 A | | 11/1999 | Beard |
| 6,120,082 A | | 9/2000 | Vandemolen |
| 6,135,225 A | | 10/2000 | Barsic |
| 6,366,190 B1 | | 4/2002 | Fujita et al. |
| 6,550,740 B1 | | 4/2003 | Burer |
| 6,616,117 B2 | | 9/2003 | Gryp et al. |
| 7,000,910 B2 | | 2/2006 | Oshimo |
| 7,568,675 B2 | | 8/2009 | Catton |
| 7,988,232 B2 | | 8/2011 | Weber et al. |
| 8,585,004 B1 | | 11/2013 | Roeglin et al. |
| 8,800,976 B2 | | 8/2014 | Bethina et al. |
| 9,527,416 B2 | | 12/2016 | Brodersen |
| 9,644,378 B2 | | 5/2017 | Knox |
| 9,694,727 B2 | | 7/2017 | Haller et al. |
| 9,758,078 B2 | | 9/2017 | Haller |
| 9,809,136 B2 | | 11/2017 | Haller et al. |
| 9,937,832 B2 | | 4/2018 | Haller |
| 10,012,286 B2 | | 7/2018 | Haller et al. |
| 10,583,753 B2 | | 3/2020 | Lorey et al. |
| 10,654,381 B2 | | 5/2020 | Lorey et al. |
| 2004/0090100 A1 | | 5/2004 | Igarashi |
| 2004/0159763 A1 | | 8/2004 | Mullinix et al. |
| 2007/0096513 A1 | | 5/2007 | Jones et al. |
| 2007/0295882 A1 | | 12/2007 | Catton |
| 2009/0134595 A1 | | 5/2009 | Haller et al. |
| 2010/0102586 A1 | | 4/2010 | Jungert et al. |
| 2010/0140991 A1 | | 6/2010 | Hassler et al. |
| 2010/0224343 A1 | | 9/2010 | Fukuma et al. |
| 2011/0226930 A1 | | 9/2011 | Enns et al. |
| 2011/0284713 A1 | | 11/2011 | Ellerich |
| 2012/0097822 A1 | | 4/2012 | Hammarskiold |
| 2012/0145875 A1 | | 6/2012 | Haller et al. |
| 2013/0140865 A1 | | 6/2013 | Shin |
| 2013/0206949 A1 | | 8/2013 | Archambault |
| 2013/0306825 A1 | | 11/2013 | Brodersen |
| 2014/0091191 A1 | | 4/2014 | Romera Carrion |
| 2014/0131542 A1 | | 5/2014 | Hodnefield et al. |
| 2014/0316661 A1 | | 10/2014 | Parker et al. |
| 2015/0232004 A1 | | 8/2015 | Haller et al. |
| 2015/0232005 A1 | | 8/2015 | Haller et al. |
| 2016/0200230 A1 | | 7/2016 | Haller |
| 2016/0207430 A1 | | 7/2016 | Haller |
| 2016/0214658 A1 | | 7/2016 | Haller |
| 2019/0009697 A1 | | 1/2019 | Lorey et al. |
| 2020/0108750 A1 | | 4/2020 | Dotzler et al. |
| 2020/0108751 A1 | | 4/2020 | Dotzler et al. |
| 2020/0122612 A1 | | 4/2020 | Fillep et al. |

FOREIGN PATENT DOCUMENTS

| | | | | |
|---|---|---|---|---|
| CN | 107310438 | | 11/2017 | |
| CN | 109435800 | | 3/2019 | |
| CN | 110497829 | | 11/2019 | |
| DE | 2309808 | | 9/1973 | |
| DE | 4238733 | | 5/1994 | |
| DE | 20101762 | | 5/2001 | |
| DE | 102006037068 A1 * | 2/2008 | ............ B60N 2/508 |
| DE | 102009022328 | | 6/2010 | |
| DE | 102009005381 A1 * | 7/2010 | ......... B60G 17/0416 |
| DE | 102015121764 | | 8/2017 | |
| DE | 102016120194 | | 4/2018 | |
| DE | 102016222800 | | 5/2018 | |
| DE | 102018112004 | | 11/2019 | |
| DE | 102018124507 | | 4/2020 | |
| DE | 102018124512 | | 4/2020 | |
| EP | 1863671 | | 1/2012 | |
| EP | 2423039 | | 2/2012 | |
| EP | 2463146 | | 6/2012 | |
| EP | 3181396 | | 6/2017 | |
| EP | 3312049 A1 * | 4/2018 | ........... B60N 2/1615 |
| EP | 3428009 | | 1/2019 | |
| FR | 912187 | | 8/1946 | |
| GB | 2009881 | | 6/1979 | |
| JP | H01-136031 | | 9/1989 | |
| JP | H03-220031 | | 9/1991 | |
| WO | WO 2004/074735 | | 9/2004 | |
| WO | WO 2007/058572 | | 5/2007 | |
| WO | WO 2009/054788 | | 4/2009 | |
| WO | WO 2014/176130 | | 10/2014 | |
| WO | WO-2016146412 A1 * | 9/2016 | ........... B60N 2/0244 |

OTHER PUBLICATIONS

Official Action for U.S. Appl. No. 17/118,877, dated Sep. 16, 2021 10 pages.
Official Action for German Patent Application No. 102019134234.1, dated Aug. 11, 2020, 7 pages.
Official Action for German Patent Application No. 102019134233.3, dated Jun. 15, 2020, 6 pages.
Official Action for German Patent Application No. 102019134237.6, dated Aug. 11, 2020, 8 pages.
Official Action with English Translation for China Patent Application No. 202011467331.8, dated Aug. 25, 2022, 13 pages.
Official Action with English Translation for China Patent Application No. 202011467949.4, dated Aug. 25, 2022, 14 pages.
Notice of Allowance for U.S. Appl. No. 17/118,877, dated Jan. 27, 2022 8 pages.
Extended Search Report with machine translation for European Patent Application No. 20000444.8, dated Apr. 16, 2021, 11pages.
Extended Search Report with machine translation for European Patent Application No. 20000443.0, dated Apr. 16, 2021, 12 pages.
Extended Search Report with machine translation for European Patent Application No. 20000445.5, dated Apr. 16, 2021, 11 pages.
Official Action for German Patent Application No. 102019134234.1, dated Mar. 10, 2023, 6 pages.
Official Action for German Patent Application No. 102019134237.6, dated Mar. 10, 2023, 12 pages.
Official Action for U.S. Appl. No. 17/118,868, dated Oct. 30, 2023 6 pages Restriction Requirement.

* cited by examiner

CUSHIONING ROLLING AND VERTICAL SUSPENSION MOVEMENTS

CROSS-REFERENCE TO RELATED APPLICATION

This application claims the benefit of German Patent Application No. 102019134237.6 filed Dec. 13, 2019, the entire contents of which are incorporated herein by reference.

FIELD

The invention relates to a vehicle seat having a suspension unit for cushioning the rolling and vertical movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm.

BACKGROUND

Vehicle seats having roll and vertical suspensions are known from the prior art; for example, WO 2014/176130 A discloses a roll suspension which can cushion rolling movements of the vehicle or the vehicle seat. However, such a rolling movement, as shown in the prior art, is very complex in terms of design and requires many actively controlled components and is also very space-consuming.

SUMMARY

The object of the present invention is therefore to provide a vehicle seat having a suspension unit for cushioning rolling and vertical suspension movements, which is constructed in a simpler manner than that shown in the prior art.

The core idea of the present invention is to provide a vehicle seat having a suspension unit for cushioning the rolling and vertical movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm, wherein the suspension unit is connected rotatably about a first axis of rotation to the vehicle seat lower part and comprises a spring element support and a first fluid spring element and a second fluid spring element, wherein the first fluid spring element and the second fluid spring element are each connected to the vehicle seat lower part and to the spring element support which is rotatably connected about a second axis of rotation to the first scissor arm and rotatably connected about a third axis of rotation to the second scissor arm, and wherein a fluid can be pumped between the first fluid spring element and the second fluid spring element by means of a pump unit, so that the vehicle seat upper part is substantially in a horizontal position.

Alternatively, the object is achieved by a vehicle seat having a suspension unit for cushioning the rolling and vertical movements of the vehicle seat, wherein the vehicle seat has a vehicle seat upper part and a vehicle seat lower part, wherein the vehicle seat upper part and the vehicle seat upper part are connected by means of the suspension unit so that the vehicle seat upper part and the vehicle seat lower part are movable relative to one another, wherein the suspension unit comprises a scissor arrangement having a first scissor arm and a second scissor arm, wherein the suspension unit is connected rotatably about a first axis of rotation to the vehicle seat lower part and comprises a spring element support and a first fluid spring element and a second fluid spring element, wherein the first fluid spring element and the second fluid spring element are each connected to the vehicle seat lower part and to the vehicle seat upper part which is rotatably connected about a second axis of rotation to the first scissor arm and rotatably connected about a third axis of rotation to the second scissor arm, and wherein a fluid can be pumped between the first fluid spring element and the second fluid spring element by means of a pump unit, so that the vehicle seat upper part is substantially in a horizontal position.

In this case, "rolling movement" is understood to mean a rotational movement of the vehicle seat about an axis of rotation which is arranged to run in the vehicle seat longitudinal direction.

The first axis of rotation is therefore particularly preferably arranged parallel to the first vehicle seat longitudinal direction.

According to a preferred embodiment, it is also provided that the vehicle seat upper part and the vehicle seat lower part can be cushioned relative to one another by means of the suspension unit.

According to a particularly preferred embodiment, the first fluid spring element the second fluid spring element is preferably a resiliently deformable air spring.

In particular, the first fluid spring element is arranged to run in the direction of the first angle and of the second angle, i.e. the first fluid spring element is arranged to run obliquely as seen in a standard coordinate system.

The standard coordinate system is formed from the vehicle seat longitudinal direction, the vehicle seat width direction and the vehicle seat height direction, which are each arranged at a right angle to one another.

Because, according to one embodiment, the first fluid spring element is connected to the spring element support and the vehicle seat lower part, it can be concluded that the first angle and the second angle are a function of the spring position of the vehicle seat. By means of a suspension movement, which can be a rolling and/or vertical suspension movement, the position of the spring element support changes in space, so that a first end of the first fluid spring element also changes its position in space, wherein a second end of the first fluid spring element, which is connected to the vehicle seat lower part, is not changed in its position. This means in particular that the first angle and the second angle are not constant during a suspension movement of the vehicle seat. In a neutral position, which means that the vehicle seat is not subject to any suspension movement, i.e. there is no relative movement of the vehicle seat upper part with respect to the vehicle seat lower part, the first angle and the second angle are constant.

Depending on the size of the first angle and the second angle, it is possible to adjust the spring stiffness of the first fluid spring element. The spring stiffness is in particular an adjustment option for the vertical direction and for the roll direction for the suspension movement. By setting the first angle and the second angle, it is possible to adjust the spring stiffness with regard to the vertical direction and the roll direction or the rolling spring direction.

It is particularly preferred that the first scissor arm and the second scissor arm intersect in a first region, viewed in the vehicle seat longitudinal direction, wherein provision is made that no structural connection is provided between the first scissor arm and the second scissor arm, with the exception of the spring element support. This means in particular that when the vehicle seat upper part moves with respect to the vehicle seat lower part, the first region, which represents the intersection region of the first scissor arm with the second scissor arm, must follow the movement of the vehicle seat. In particular, this means that there is no common axis of rotation between the first scissor arm and the second scissor arm.

It can be provided that the first scissor arm and the second scissor arm are force-connected, for example by a frictional force, if the scissor arms are in contact with one another.

The above-described forced guidance or forced movement of the spring element support due to the movement of the vehicle seat upper part relative to the vehicle seat lower part produces a spring force of the first fluid spring element and the second fluid spring element, so that cushioning of the vehicle seat is caused by the suspension unit.

According to an alternative embodiment, a structural connection is provided between the first scissor arm and the second scissor arm, so that the scissor arrangement is a scissor frame in the conventional sense, i.e. the scissor arms are rotatably connected to one another about a common axis of rotation. In this case, the spring element support is preferably fastened directly to the common axis of rotation.

Generally speaking, when the vehicle seat upper part moves relative to the vehicle seat lower part in a vertical direction, i.e. in the vehicle seat height direction, due to an external force acting on the vehicle seat, the rotatable arrangement of the spring element support on the first scissor arm or the second scissor arm causes a corresponding movement of the spring element support. This means that in the event of a vertical deflection, i.e. a deflection in the vehicle seat height direction, the spring element support experiences a linear displacement corresponding to the vehicle seat upper part in the vehicle seat height direction. In the event of a rolling movement of the vehicle seat, i.e. in the event of a rotation of the vehicle seat upper part relative to the vehicle seat lower part about the first axis of rotation, the spring element support is also subjected to such a rolling movement. The first fluid spring element and the second fluid spring element are deformed by the rolling movement of the spring element support, so that a spring force is produced which counteracts the rolling movement.

According to the invention, it is provided that the suspension unit comprises a second fluid spring element, wherein the second fluid spring element is connected on the one hand to the vehicle seat lower part and on the other hand to the spring element support, and wherein the second fluid spring element is arranged at a third angle to the vehicle seat width direction and arranged at a fourth angle to the vehicle seat height direction.

The second fluid spring element is particularly preferably arranged in such a way that, with respect to a plane formed from the vehicle seat longitudinal direction and the vehicle seat height direction, the first fluid spring element is arranged on a first side of the plane and the second fluid spring element is arranged on the second side of the plane.

It is also possible that the first angle corresponds to the third angle and the second angle corresponds to the fourth angle, so that the first fluid spring element and the second fluid spring element are arranged symmetrically to one another with respect to the plane formed from the vehicle seat longitudinal direction and the vehicle seat height direction.

However, it is also possible that the first angle has a different value from the third angle and that the second angle has a different value from the fourth angle.

It is pointed out that "symmetrical" is to be understood to mean in the neutral state or the neutral position, i.e. no external force is acting on the vehicle seat. With a suspension movement of the vehicle seat, the arrangement of the fluid spring elements in relation to one another changes since, in particular during a rolling movement, one fluid spring element is compressed and the other fluid spring element is correspondingly decompressed, i.e. one fluid spring element is compressed and the other fluid spring element is stretched in its length.

According to a particularly preferred embodiment, it is provided that the first angle and the second angle can each assume a value from a range of 0 to 90°].

According to a further preferred embodiment, it is provided that the third angle and the fourth angle can each assume a value from a range of 0 to 90°].

It is particularly preferably provided that the first angle, the second angle, the third angle and the fourth angle cannot assume the angle value 90°, i.e. the angles can each assume a value in the range of 0 to 90°[. This means that, when seen in particular in the vehicle seat height direction, the spring elements do not correspond to a vertical spring.

According to a particularly preferred embodiment, it is provided that the pumping of the fluid is such that during a deflection of the vehicle seat, depending on the direction and type of deflection, fluid is pumped from the first fluid spring element to the second fluid spring element or vice versa, and the pumping of the fluid is prevented during a neutral position of the vehicle seat.

According to a further preferred embodiment, it is provided that a differential pressure measuring device is provided, which is fluidically connected to the first fluid spring element and the second fluid spring element and is arranged parallel to the pump unit, the differential pressure measuring device being provided and configured to detect pressure fluctuations between the first fluid spring element and the second fluid spring element.

In particular, in the event of rolling movements, fluid is pumped between the fluid spring elements. If the vehicle seat is not deflected or the vehicle seat is deflected vertically, no pumping is necessary since the vehicle seat upper part remains in its horizontal arrangement.

A distinction is made between different deflections in terms of type. A first deflection is conceivable when the vehicle is in an inclined position or is constantly moving in an inclined position, for example when ploughing or the like. The pump unit pumps fluid from one fluid spring element to the other fluid spring element until the vertical force of the individual fluid spring elements is the same, i.e. the vehicle seat upper part is held in the horizontal position. The differential pressure measuring device can preferably be used to determine an amount of air which is to be pumped between the first fluid spring element and the second fluid spring element. Due to the general relationship between acting force, pressure and (effective) surface A, the pressure deviation or pressure difference can be recorded by means of the differential pressure measuring device and thus the force can be adjusted.

In this way, the required amount of fluid can be determined by means of the differential pressure measuring device.

A second deflection is conceivable when the vehicle is moving dynamically, i.e. the vehicle is subject to vibration which is also transmitted to the vehicle seat. A distinction must be made between high-frequency and low-frequency vibration.

With the low-frequency vibration, the vehicle is rocked in a low frequency range. Pressure fluctuations in the fluid spring elements are preferably determined by means of the differential pressure measuring device and the pump unit is controlled accordingly. A prerequisite for this is, of course, that the pump unit is designed to be able to provide this output, i.e. with regard to the pump output and the fluid throughput.

In the case of a high-frequency vibration with a small amplitude, the situation is different. The differential pressure measuring device registers changes in the differential pressure which do not exceed a definable pressure level. The amplitude ratio between the amplitude of the suspension in the roll direction and the deflection of the vehicle is less than 1, so that the vibrating system is in a (super)critical range. Pumping by means of the pump unit is uneconomical in this case and is deactivated or interrupted, since a pump that is too large or a pump with a high pumping capacity would be necessary.

Another situation is a high-frequency vibration with a large amplitude, which means that a sudden change in the differential pressure which exceeds the definable pressure level is registered.

For this case, it is provided according to a preferred embodiment that a first valve element is provided which is arranged parallel to the pump unit, the valve element being opened in the event of a high-frequency deflection with a large amplitude, and otherwise being closed.

The sudden opening of the first valve element can result in a sudden pressure equalization between the fluid spring elements so that, due to the inertia of the vehicle seat upper part, the original position thereof, i.e. the horizontal position of the vehicle seat upper part, can be maintained.

According to a further preferred embodiment, it is provided that a second valve element and a third valve element are provided, the second valve element being fluidically connected to the first fluid spring element and the third valve element being fluidically connected to the second fluid spring element, the second valve element and the third valve element being arranged parallel to one another, and the second valve element and the third valve element being fluidically connected to a compressor unit by means of a fourth valve element, a fluid being able to be fed into a fluid spring element or into both fluid spring elements or from one or both fluid spring elements depending on a switching position of the second valve element, the third valve element, and the fourth valve element.

The system can be filled with the fluid via the compressor unit so that the basic height of the suspension can be adjusted. The fourth valve element, which is preferably designed as a 3/2-way valve, is used for the air outlet and thus for setting a lower seat position. The second valve element and the third valve element must be activated together with the compressor unit, so that the air can continue to flow to the air springs. When actuating only one of these valves, one fluid spring element can be subjected to more pressure than the other. This serves, for example, to compensate for static deflection.

Furthermore, the fluid can be pumped from the one fluid spring element into the other fluid spring element by means of the pump unit. This is the implementation of the active vibration isolation described in the roll direction. The first valve element must have a significantly larger flow cross section than the second valve element and the third valve element. A rapid pressure equalization between the fluid spring elements can thus take place when the fourth valve element is actuated. This is helpful, for example, if the seat upper part of the suspension is to hold its horizontal position during very fast movements of the vehicle cab floor. Opening this line then does not generate any additional force component in the direction of deflection.

For a short reaction time, the hose lines should be as short as possible. Therefore, the fourth valve element should be arranged as close as possible between the fluid spring elements.

According to a further preferred embodiment, it is provided that a first sensor is arranged on the vehicle seat upper part and a second sensor is arranged on the vehicle seat lower part, deviations from the horizontal position of the vehicle seat upper part being able to be determined by means of the first sensor and an amplitude and a frequency of the deflection of the suspension lower part or cab floor being able to be determined by means of the second sensor.

The first sensor is preferably an angle sensor.

The underlying object is also achieved by a method for cushioning rolling movements of a vehicle seat according to any of claims 1 to 10, comprising the method steps:
 a) detecting a deflection of the vehicle seat on the vehicle seat upper part and/or the deflection on the vehicle seat lower part and an amplitude and a frequency of the deflection on the vehicle seat lower part;
 b) determining an amount of fluid to be pumped between the first fluid spring element and the second fluid spring element, and pumping this amount of fluid so that the vehicle seat upper part is held in a horizontal position.

According to a further preferred embodiment, it is provided that the first axis of rotation is arranged parallel to the vehicle seat longitudinal direction, and preferably the second axis of rotation and the third axis of rotation are arranged running in the vehicle seat width direction and the second and the third axis of rotation are arranged parallel to one another.

In particular, the arrangement of the second axis of rotation and the third axis of rotation can prevent the scissor arrangement with the spring element support from tilting, in particular when the vehicle seat upper part moves relative to the vehicle seat lower part.

According to a particularly preferred embodiment, it is provided that the first axis of rotation is defined by a shaft which is rotatably connected to the vehicle seat lower part. The shaft preferably has a first end and a second end, wherein the first end and the second end each are rotatably connected to the vehicle seat lower part. Instead of a shaft, a rod element is also conceivable, wherein it is possible for the shaft or the rod element to be cylindrical or angular. If the rod element is angular, it is rotatably connected to the vehicle seat lower part.

According to a further preferred embodiment, it is provided that the first scissor arm is connected to the vehicle seat upper part by means of a first floating bearing and to the shaft by means of a second floating bearing, and the second scissor arm is connected to the vehicle seat upper part by means of a third floating bearing and to the shaft by means of a fourth floating bearing. Such a configuration also allows a pitching suspension movement of the vehicle seat by means of the suspension unit.

According to the design of the first scissor arm and the second scissor arm by means of four floating bearings for connection to the vehicle seat upper part and the vehicle seat lower part, it is achieved that a stronger pitching movement of the vehicle seat is obtained when the vehicle seat is pitched and when the vehicle seat upper part follows the vehicle seat lower part accordingly. Because four floating bearings are provided, the suspension unit is mechanically indeterminate, i.e. degrees of freedom still exist which cannot be adequately determined. In order to further minimize these degrees of freedom, a first connecting element and a second connecting element are provided, which minimize the degrees of freedom of the four floating bearings through the corresponding arrangement with the first scissor arm and the second scissor arm and the vehicle seat upper part and the vehicle seat lower part. Particularly preferably, a first connecting element is provided which connects the first scissor arm to a fixed bearing which is arranged on the shaft, and wherein a second connecting element is provided which has a first connecting element part and a second connecting element part, wherein the first connecting element part is rotatably connected to the second scissor arm and the second connecting element part, and wherein the second connecting element part is rotatably connected to the first connecting element part, the first scissor arm, and the vehicle seat upper part.

According to a further preferred embodiment, it is provided that the second floating bearing and the fourth floating bearing are each designed as a displacement element so that the first scissor arm and the second scissor arm are in each case displaceable relative to the shaft. A displacement with respect to the shaft means that a displacement of the first scissor arm and of the second scissor arm is provided in the vehicle seat longitudinal direction. The displacement element can be designed as a sliding element or as a rolling element, so that a smooth displacement of the first scissor arm and the second scissor arm relative to the shaft can be ensured.

According to a further preferred embodiment, it is provided that, when viewed in the longitudinal direction of the vehicle seat, the second floating bearing is arranged in front of the third floating bearing and the first floating bearing is arranged in front of the fourth floating bearing.

By a rolling movement of the vehicle seat and a corresponding tracking of the spring support element, which is in connection with the first or the second fluid spring element, which can in particular be designed to be resiliently deformable, the spring support element causes deformation of the fluid spring elements, whereby a spring force or a resetting force of the fluid spring elements is generated.

Further advantageous embodiments result from the dependent claims.

BRIEF DESCRIPTION OF THE DRAWINGS

Additional aims, advantages and expedient uses of the present invention can be found in the following description in conjunction with the drawings, in which.

DETAILED DESCRIPTION

In the drawings, the same components are denoted by the same reference signs, wherein it is possible for the reference signs to be omitted in some drawings for greater clarity.

Figure 1A:
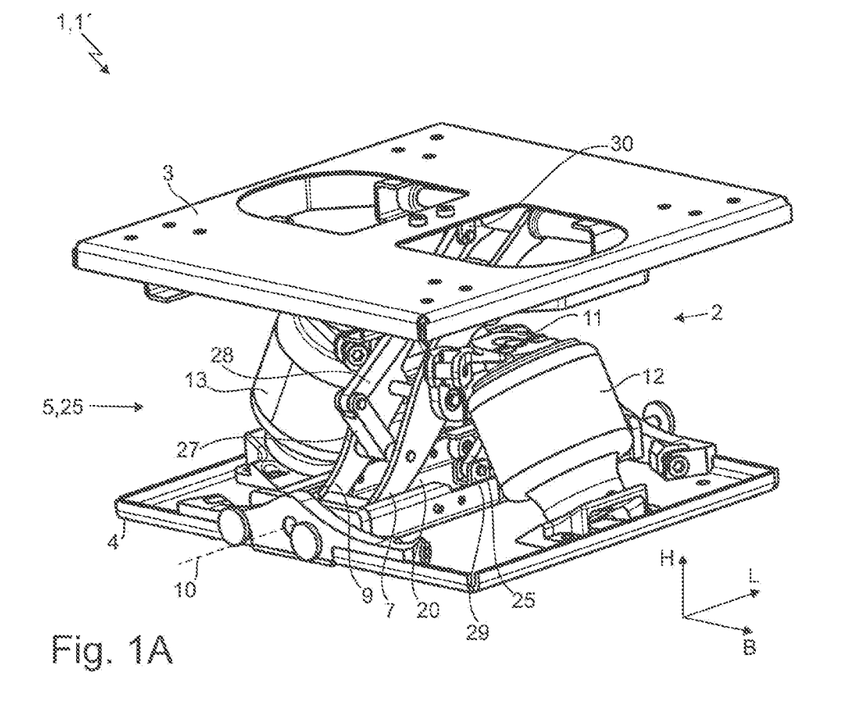
FIG. 1A is a perspective view of a vehicle seat according to a preferred embodiment.

FIG. 1A shows a vehicle seat 1 or a vehicle seat substructure 1', wherein the vehicle seat 1 has a vehicle seat upper part 3 and a vehicle seat lower part 4, which are connected to one another by means of a suspension unit 2 in such a way that the vehicle seat upper part and the vehicle seat lower part can be moved and cushioned relative to one another. It can also be seen that the suspension unit 2 is rotatably connected about a first axis of rotation 10 to the vehicle seat lower part 4.

The suspension unit 2 comprises a scissor arrangement 5 having a first scissor arm 6 and a second scissor arm 7, wherein the suspension unit further comprises a spring element support 11 and a first fluid spring element 12 and a second fluid spring element 13. As can be seen, the spring element support is rotatably connected about a second axis of rotation to the first scissor arm and rotatably connected about a third axis of rotation 15 to the second scissor arm 7, wherein the first fluid spring element 12 is connected to the vehicle seat lower part 4 on the one hand and to the spring element support 11 on the other hand, wherein the first fluid spring element 12 is further arranged at a first angle 16 to a vehicle seat width direction B and at a second angle 17 to a vehicle seat height direction H.

The more detailed arrangement of the fluid spring elements 12, 13 and the more detailed configuration of the scissor arrangement 5 are described further in the following drawings.

The first fluid spring element 12 and the second fluid spring element 13 are embodied in FIG. 1A as a resiliently deformable air spring.

It is also conceivable that the first spring element 12 is designed as an air spring and the second spring element 13 as a mechanical spring, or vice versa.

Furthermore, the scissor arrangement 5 has a first connecting element 25 and a second connecting element 26, wherein the second connecting element 25 has a first connecting element part 27 and a second connecting element part 28, wherein the first connecting element 25 is rotatably connected to the first scissor arm 6 and on the other hand is connected to a first fixed bearing 29, wherein the first fixed bearing 29 is connected to a shaft 20.

Furthermore, the first connecting element part 27 is rotatably connected to the second scissor arm 7 and rotatably connected to the second connecting element part 28, wherein the second connecting element part 28 is further rotatably connected to the first scissor arm 7 and connected to the vehicle seat upper part 3 by means of a fixed bearing 30.

Figure 1B:
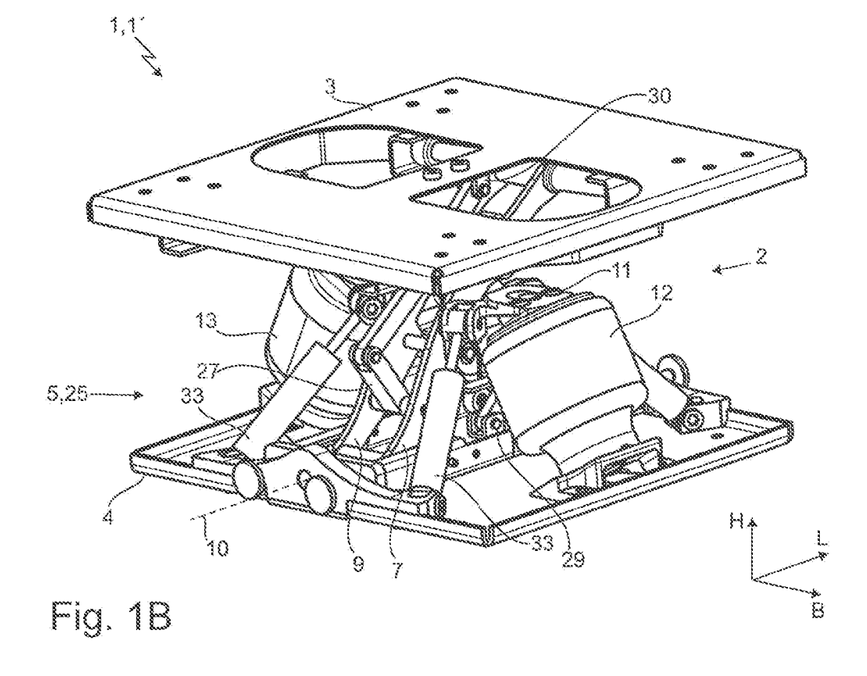
FIG. 1B shows the vehicle seat according to FIG. 1A in a further embodiment.

FIG. 1B shows the same vehicle seat 1 as shown in FIG. 1A, wherein damper elements 33 are additionally provided, wherein at least one damper element 33, preferably at least two damper elements 33 and particularly preferably four damper elements 33 are provided, which are each arranged at an angle to the vehicle seat longitudinal direction L, the vehicle seat width direction B and the vehicle seat height direction H. Furthermore, the damper elements 33 are connected on the one hand to the spring element support 11 and on the other hand to the vehicle seat lower part 4.

Figure 2A:
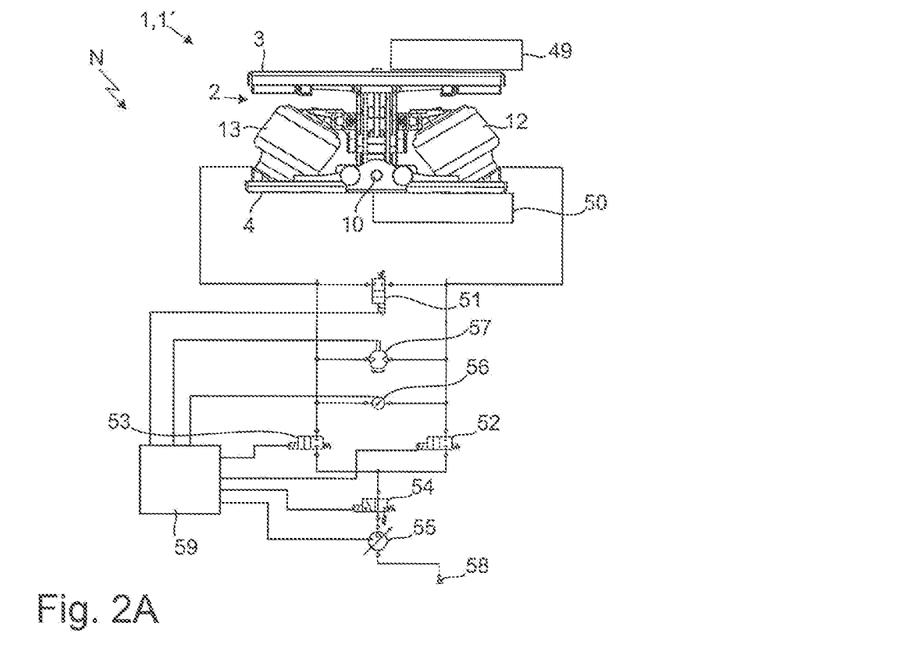
FIG. 2A shows the vehicle seat according to a preferred embodiment in a neutral position.
Figure 2B:
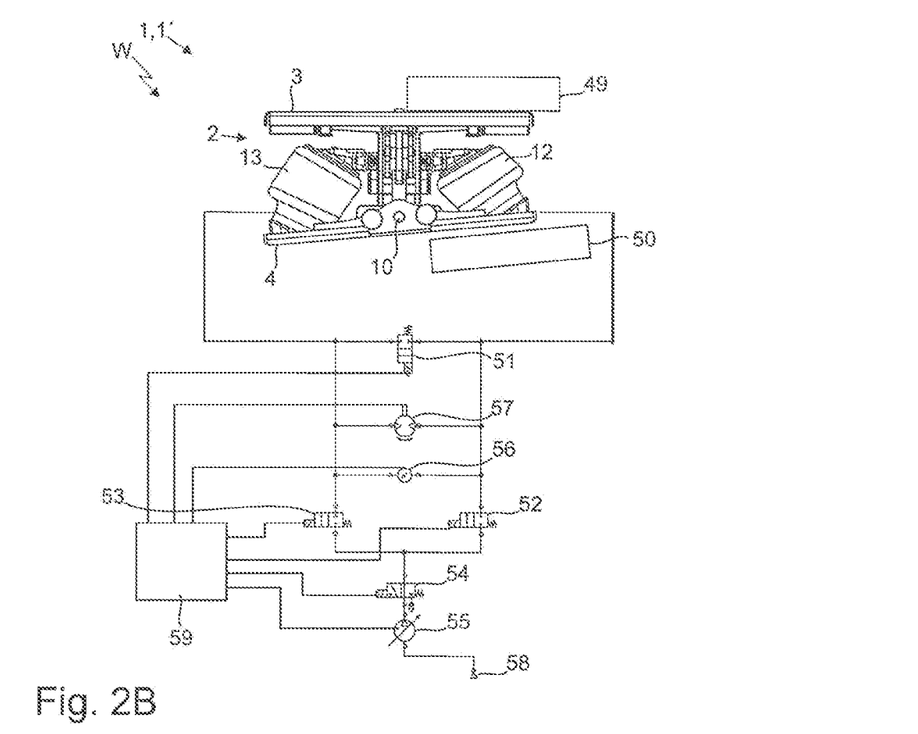
FIG. 2B shows the vehicle seat according to FIG. 2A deflected position.

In FIGS. 2A and 2B, a vehicle seat 1 according to an embodiment of the invention is shown schematically, wherein the vehicle seat 1 according to FIG. 2A is shown in the neutral position N or horizontal position and according to FIG. 2B is shown in a rolling position W, wherein the rolling position W has already been compensated for, since the vehicle seat upper part 3 is in the horizontal position.

The underlying components as well as the arrangement and function thereof are briefly described and illustrated below.

In particular, a pump unit 57 is provided which is in fluidic connection with the first fluid spring element 12 and the second fluid spring element 13. In the event of a rolling movement of the vehicle seat 1, which is caused by an external force acting on the vehicle seat 1, a pressure equalization is carried out between the first fluid spring element 12 and the second fluid spring element 13 depending on the type of deflection or rolling movement.

It is provided that the pumping of the fluid is such that during a deflection of the vehicle seat 1, depending on the direction and type of deflection, fluid is pumped from the first fluid spring element 12 to the second fluid spring element 13 or vice versa, and the pumping of the fluid is prevented during a neutral position of the vehicle seat 1.

The neutral position or horizontal position means that no force acts on the vehicle seat and in particular the vehicle seat upper part 3, so that the vehicle seat upper part 3 remains in the horizontal position.

It is further provided that a differential pressure measuring device 56 is provided which is fluidically connected to the first fluid spring element 12 and the second fluid spring element 13 and is arranged parallel to the pump unit 57, the differential pressure measuring device 56 being provided and configured to detect pressure fluctuations between the first fluid spring element 12 and the second fluid spring element 13.

In particular, in the event of rolling movements, fluid is pumped between the fluid spring elements 12, 13. If the vehicle seat 1 is not deflected or the vehicle seat 1 is deflected vertically, no pumping is necessary since the vehicle seat upper part 3 remains in its horizontal arrangement.

A distinction is made between different deflections in terms of type. A first deflection is conceivable when the vehicle is in an inclined position or is constantly moving in an inclined position, for example when ploughing or the like. The pump unit 57 pumps fluid from the one fluid spring element 12, 13 to the other fluid spring element 12, 13 until the acting vertical force of the individual fluid spring elements 12, 13 is the same, i.e. the vehicle seat upper part 3 is held in the horizontal position. The differential pressure measuring device 56 can be used to determine an amount of air which is to be pumped between the first fluid spring element 12 and the second fluid spring element 13. Due to the general relationship between acting force, pressure and (effective) surface A, the pressure deviation or pressure difference can be recorded by means of the differential pressure measuring device and thus the force can be adjusted.

In this way, the required amount of fluid can be determined by means of the differential pressure measuring device 56.

A second deflection is conceivable when the vehicle is moving dynamically, i.e. the vehicle is subject to vibration which is also transmitted to the vehicle seat 1. A distinction must be made between high-frequency and low-frequency vibration.

With the low-frequency vibration, the vehicle is rocked in a low frequency range. Pressure fluctuations in the fluid spring elements are preferably determined by means of the differential pressure measuring device 56 and the pump unit 57 is controlled accordingly. A prerequisite for this is, of course, that the pump unit 57 is designed to be able to provide this output, i.e. with regard to the pump output and the fluid throughput.

In the case of a high-frequency vibration with a small amplitude, the situation is different. The differential pressure measuring device 56 registers changes in the differential pressure, i.e. the pressure difference between the pressures of the first fluid spring element 12 and the second fluid spring element 13, which do not exceed a definable pressure level. The amplitude ratio between the amplitude of the differential pressure and the deflection of the vehicle is less than 1, so that the vibrating system is in a (super)critical range. Pumping by means of the pump unit 57 is uneconomical in this case and is deactivated or interrupted, since a pump that is too large or a pump with a high pumping capacity would be necessary.

Another situation is a high-frequency vibration with a large amplitude, which means that a sudden change in the differential pressure which exceeds the definable pressure level is registered.

For this case, it is provided according to a preferred embodiment that a first valve element 51 is provided which is arranged parallel to the pump unit 57, the first valve element 51 being opened in the event of a high-frequency deflection with a large amplitude and otherwise being closed.

The sudden opening of the first valve element 51 can result in a sudden pressure equalization between the fluid spring elements 12, 13 so that, due to the inertia of the vehicle seat upper part 3, the original position thereof, i.e. the horizontal position of the vehicle seat upper part 3, can be maintained.

According to a further preferred embodiment, it is provided that a second valve element 52 and a third valve element 53 are provided, the second valve element 52 being fluidically connected to the first fluid spring element 12 and the third valve element 53 being fluidically connected to the second fluid spring element 13, the second valve element 52 and the third valve element 53 being arranged parallel to one another, and the second valve element 52 and the third valve element 53 being fluidically connected to a compressor unit 55 by means of a fourth valve element 54, a fluid being able to be fed into a fluid spring element 12, 13 or into both fluid spring elements 12, 13 or from one or both fluid spring elements 12, 13 depending on a switching position of the second valve element 52, the third valve element 53 and the fourth valve element 54.

In order to be able to convey fluid into the system, it is necessary that the fourth valve element 54 is open. If the fourth valve element 54 is closed, no fluid can be conveyed to the fluid spring elements 12, 13.

If the fourth valve element 54 is open, the following positions of the second valve element 52 and the third valve element 53 can be possible:

the second valve element 52 and the third valve element 53 are open;

the second valve element 52 is open and the third valve element 53 is closed;

the second valve element 52 is closed and the third valve element 53 is open.

If both valve elements 52, 53 are open, fluid can flow into both fluid spring elements 12, 13, whereby the seat position can be adjusted.

If only one of the two valve elements 52, 53 is open, only the correspondingly associated fluid spring element 12, 13 is filled with fluid or fluid is removed. This is particularly advantageous when driving on a slope or the like.

The system can be filled with the fluid via the compressor unit 55, which is fluidically connected to a fluid source 58, so that the basic height of the suspension can be adjusted. The fourth valve element 54, which is preferably designed as a 3/2-way valve, is used for the fluid outlet and thus for setting a lower or higher seat position. The second valve element 52 and the third valve element 53 must be activated together with the compressor unit 58, so that the air can continue to flow to the fluid spring elements 12, 13. When actuating only one of these valve elements 52, 53, one fluid spring element 12, 13 can be subjected to more pressure than the other. This serves, for example, to compensate for static deflection.

Furthermore, the fluid can be pumped from the one fluid spring element 12, 13 into the other fluid spring element 12, 13 by means of the pump unit 57. This is the implementation of the active vibration isolation described in the roll direction W. The first valve element 51 has a significantly larger flow cross section than the second valve element 52 and the third valve element 53. A rapid pressure equalization between the fluid spring elements 12, 13 can thus take place when the fourth valve element 54 is actuated. This is helpful, for example, if the vehicle seat upper part 3 of the suspension is to hold its horizontal position during very fast movements of the vehicle cab floor. Opening this line then does not generate any additional force component in the direction of deflection.

For a short reaction time, the hose lines, which represent the fluidic connections between the respective elements, should be as short as possible. Therefore, the fourth valve element 54 should be arranged as close as possible between the fluid spring elements 12, 13.

According to a further preferred embodiment, it is provided that a first sensor 49 is arranged on the vehicle seat upper part 3 and a second sensor 50 is arranged on the vehicle seat lower part 4, deviations from the horizontal position of the vehicle seat upper part 3 being able to be determined by means of the first sensor 49 and an amplitude and a frequency of the deflection of the vehicle seat 1 being able to be determined by means of the second sensor 50.

Figure 3A:
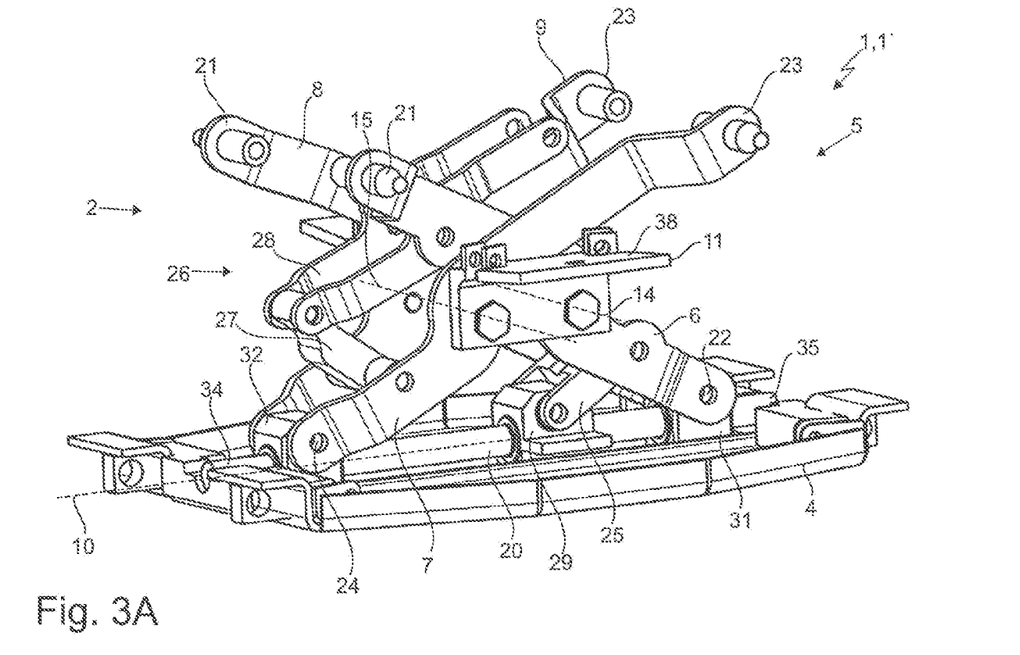
FIG. 3A shows the scissor arrangement according to a first embodiment.
Figure 3B:
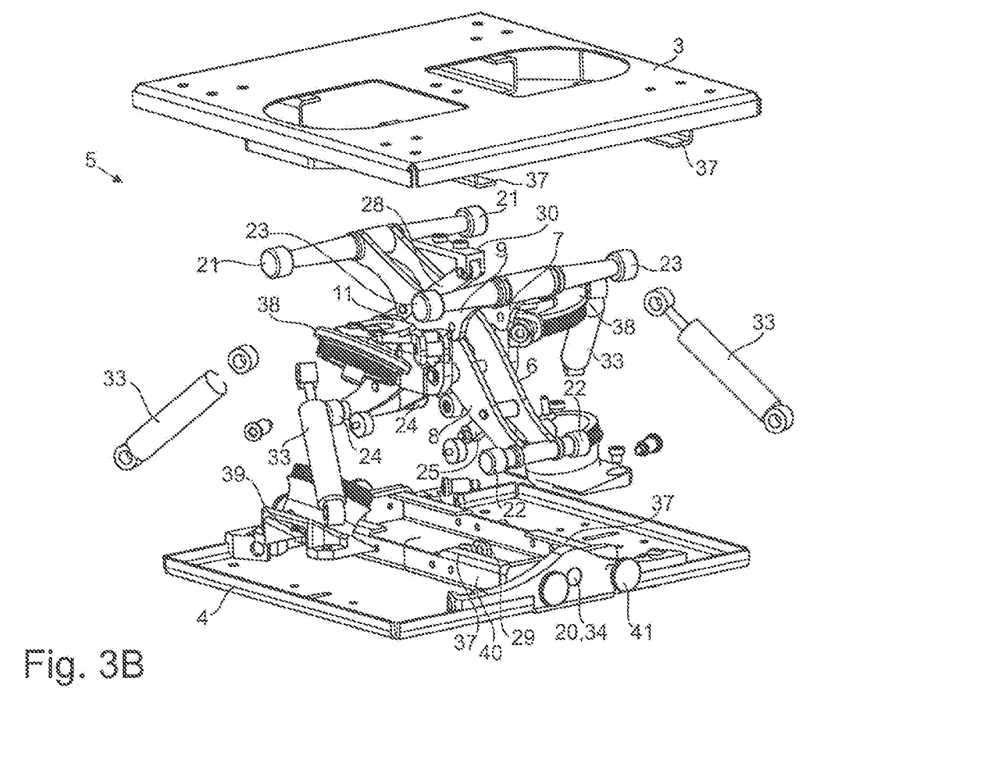
FIG. 3B shows the scissor arrangement according to a second embodiment.

A first embodiment of the scissor arrangement 5 can be seen in FIG. 3A and a second embodiment of the scissor arrangement 5 can be seen in FIG. 3B.

The embodiment of the scissor arrangement 5 according to FIG. 3A will be described first.

The scissor arrangement 5 comprises a first scissor arm 6, a second scissor arm 7, a third scissor arm 8 and a fourth scissor arm 9.

The designs of the third scissor arm 8 and the fourth scissor arm 9 apply correspondingly to the associated first scissor arm 5 and the associated second scissor arm 7. This is particularly true since the third scissor arm 8 runs identically to the first scissor arm 6 and the fourth scissor arm 9 runs identically to the second scissor arm 7.

As can also be seen, the spring element support 11 is provided, which is rotatably connected about a second axis of rotation 14 to the first scissor arm 6 and rotatably connected about a third axis of rotation 15 to the second scissor arm 7.

Furthermore, the first scissor arm 6 is connected to the vehicle seat upper part 3 by means of a first floating bearing 21 and to a shaft 20 by means of a second floating bearing 22, and the second scissor arm 7 is connected to the vehicle seat upper part 3 by means of a third floating bearing 23 and to the shaft 20 by means of a fourth floating bearing 24, wherein a first connecting element 25 connects the first scissor arm 6 to a first fixed bearing 29 which is arranged on the shaft 20, and wherein a second connecting element 26 is provided which has a first connecting element part 27 and a second connecting element part 28, wherein the first connecting element part 27 is rotatably connected to the second scissor arm 7 and the second connecting element part 28, and wherein the second connecting element part 28 is rotatably connected to the first connecting element part 27, the first scissor arm 6 and the vehicle seat upper part 3. The second connecting element part 28 is rotatably connected in particular to a second fixed bearing 30. The second fixed bearing is arranged on the vehicle seat upper part 3.

The first floating bearing 21 and the second floating bearing 23 are each designed as running rollers 36, which are rotatably connected to the respective scissor arm 6, 7, 8, 9 and are mounted in a rolling manner in a running rail 37, wherein the running rail 37 is arranged on the vehicle seat upper part 3.

The second floating bearing 22 and the fourth floating bearing 24 are designed in such a way that a first displacement element 31 and a second displacement element 32 are provided, wherein the first scissor arm 6 is rotatably connected to the first displacement element and the second scissor arm 7 is rotatably arranged on the second displacement element 32.

The displacement elements 31, 32 can be displaced in such a way that they can be displaced with respect to the shaft 20 in the direction of the first axis of rotation 10.

The first displacement element 31 and the second displacement element 32 are displaced in particular when the vehicle seat 1 carries out a vertical movement.

Because the scissor arms 6, 7, 8, 9 are each connected to the vehicle seat lower part or to the vehicle seat upper part 3 by means of a floating bearing, it is necessary to limit the degrees of freedom with regard to the movement of the scissor arrangement 5. This is done by means of the first connecting element 25 and the second connecting element 26.

Furthermore, the spring element support 11 has an adapter plate 38, by means of which the respective fluid spring element 12, 13 (not shown here) can be connected to the spring element support 11.

The second embodiment, which is shown in FIG. 3B, is identical in terms of its functional principle to the embodiment of FIG. 3A, although the configuration differs.

The embodiment of FIG. 3B also comprises a first scissor arm 6, a second scissor arm 7, a third scissor arm 8, and a fourth scissor arm 9, wherein the first scissor arm 6 and the third scissor arm 8 as well as the second scissor arm 7 and the fourth scissor arm 9 each run identically. Likewise, the respective scissor arms 6, 7, 8, 9 are guided in the guide rail 37 of the vehicle seat upper part 3 by means of a floating bearing 21, 23 which is designed as a running roller 36.

This embodiment also has the first connecting element 25 and the second connecting element 26 in the same arrangement and function as described in FIG. 3A.

The arrangement of the floating bearings 22, 24 with respect to the vehicle seat lower part 4 is different in this case. In particular, a support part 40 is shown which is rotatably connected to the vehicle seat lower part 4 about the first axis of rotation 10. A shaft 20 is provided at the front and the rear end of the support part in the vehicle seat longitudinal direction L, the support part 40 also having running rails 37 in which the floating bearings 22, 24 can roll by means of running rollers 36 with respect to the support part 40.

The first fixed bearing 29, by means of which the first scissor arm 6 is connected by means of the first connecting element 25, is also arranged on the support part 40.

A lower adapter plate 39 is also shown schematically in FIG. 3B, by means of which the fluid spring element 12, 13 can in each case be connected to the vehicle seat lower part 4. As can be seen, the lower adapter plate 39 has an inclined portion, by means of which the angle of the corresponding fluid spring element 12, 13 can be adjusted.

The same also applies to the upper adapter plate 38, which has an angle with respect to the vehicle seat width direction B, wherein the inclination of the upper adapter plate 38 and of the lower adapter plate 39 are parallel to one another.

Figure 4A:
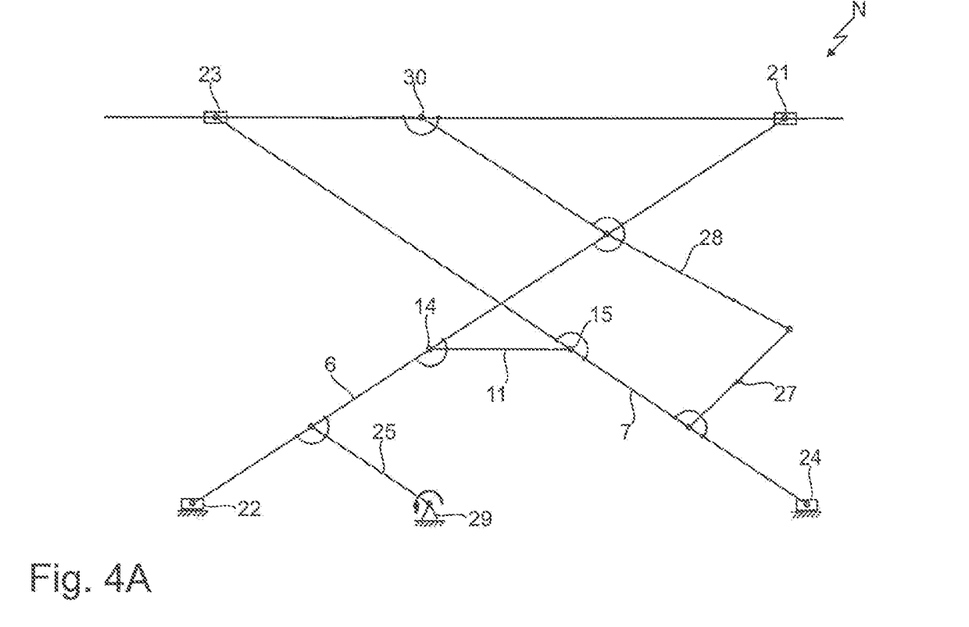
FIG. 4A is a schematic representation of the vehicle seat according to FIG. 1A in the neutral position.
Figure 4B:
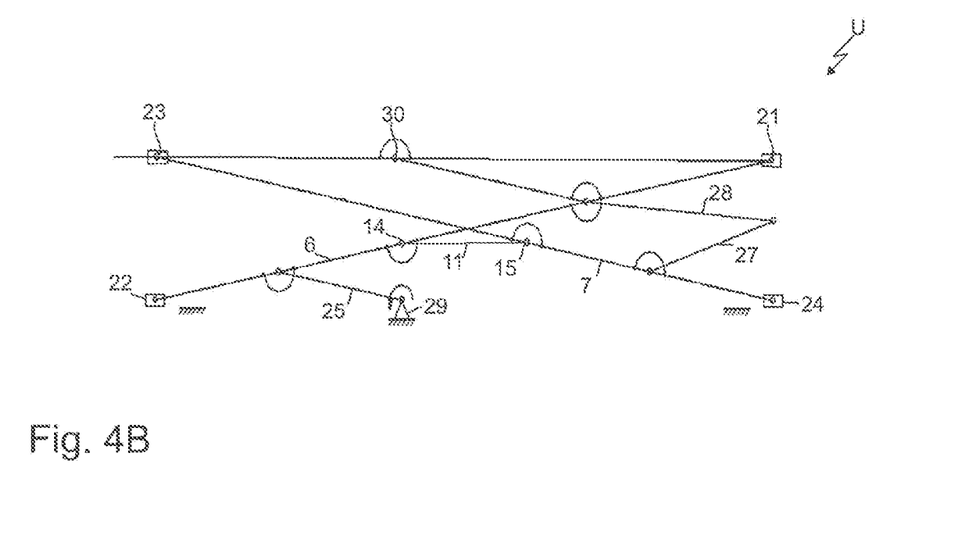
FIG. 4B is a schematic representation of the vehicle seat according to FIG. 1A in the downwardly displaced position.

In FIGS. 4A and 4B, the kinematics of the moving parts of the vehicle seat 1 is shown again schematically.

In FIG. 4A, the vehicle seat is shown in the neutral position N and in FIG. 4B in the downward position U.

The movement of the moving parts, which are denoted by the corresponding reference signs, can be seen by comparing FIGS. 4A and 4B.

Figure 5A:
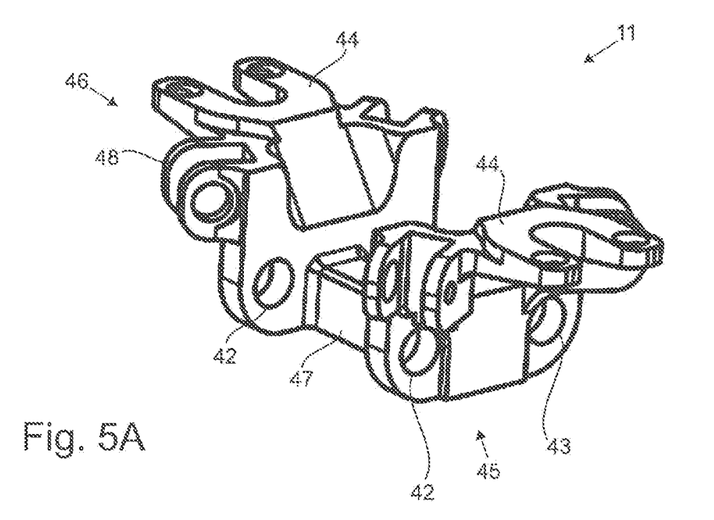
FIG. 5A is a first perspective view of the spring support element.
Figure 5B:
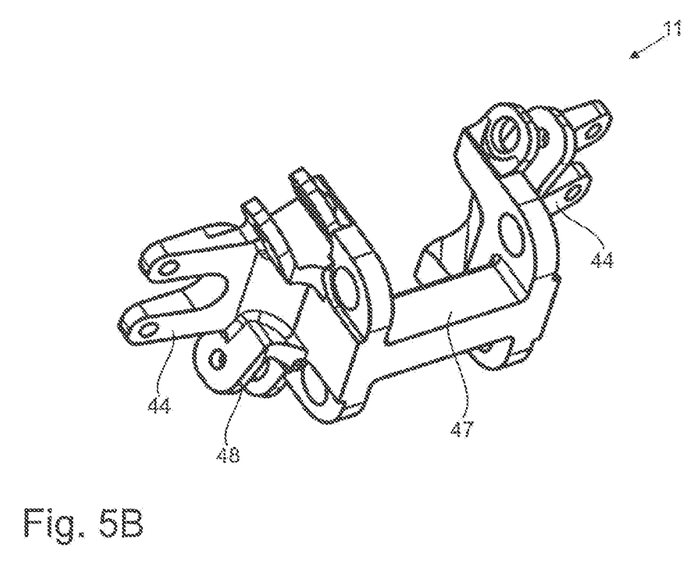
FIG. 5B is a second perspective view of a spring support element.

Furthermore, FIGS. 5A and 5B show the spring element support 11 in a first perspective representation and in a second perspective representation.

The spring element support 11 has a first spring element support holder 45 and a second spring element support holder 46, which are connected to one another by means of a connecting part 47. The respective spring element support holder 45, 46 has a first connection point 42 and a second connection point 43, by means of which the spring element support can be connected, in particular rotatably, to the first scissor arm 6 and the second scissor arm 7, or to the third scissor arm 8 and the fourth scissor arm 9.

Furthermore, both the first spring element holder 45 and the second spring element holder 46 have an adapter plate holder 44, by means of which the upper adapter plate 38 can be connected to the spring element support.

All features disclosed in the application documents are claimed as being substantial to the invention, provided that they are, individually or in combination, novel over the prior art.

LIST OF REFERENCE SIGNS

1 Vehicle seat
2 Suspension unit
3 Vehicle seat upper part
4 Vehicle seat lower part
5 Scissor arrangement
6 First scissor arm
7 Second scissor arm
8 Third scissor arm
9 Fourth scissor arm
10 First axis of rotation
11 Spring element support
12 First fluid spring element
13 Second fluid spring element
14 Second axis of rotation
15 Third axis of rotation
20 Shaft
21 First floating bearing
22 Second floating bearing
23 Third floating bearing
24 Fourth floating bearing
25 First connecting element
26 Second connecting element
27 First connecting element part
28 Second connecting element part
29 First fixed bearing
30 Second fixed bearing
31 First displacement element
32 Second displacement element
33 Damper element
34 First end of the shaft
35 Second end of the shaft
36 Running roller
37 Running rail
38 Adapter plate
39 Lower adapter plate
40 Support part
41 Locking element
42 First connection point
43 Second connection point
44 Adapter plate holder
45 First spring element support holder
46 Second spring element support holder
47 Connecting part
48 Damper element holder
49 First sensor
50 Second sensor
51 First valve element
52 Second valve element
53 Third valve element
54 Fourth valve element
55 Compressor unit
56 Differential pressure measuring device
57 Pump unit
58 Fluid source
59 Control unit
N Neutral position
O Upward deflected position
U Downward deflected position
W Rolling position
L Vehicle seat longitudinal direction
B Vehicle seat width direction
H Vehicle seat height direction

What is claimed is:

1. A vehicle seat comprising a suspension unit for cushioning rolling and vertical suspension movements of the vehicle seat, wherein the vehicle seat has a vehicle seat upper part and a vehicle seat lower part, wherein the vehicle seat upper part and the vehicle seat lower part are connected by the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a spring element support and a first fluid spring element and a second fluid spring element, wherein the first fluid spring element and the second fluid spring element are each connected to the vehicle seat lower part and to the spring element support, wherein the first axis of rotation is parallel to the vehicle seat in a longitudinal direction, and wherein during a rotation of the vehicle seat upper part relative to the vehicle seat lower part about the first axis of rotation at least one of the first spring element and the second spring element are deformed by a movement of the spring element support.

2. The vehicle seat according to claim 1, wherein a fluid is pumped between the first fluid spring element and the second fluid spring element by a pump unit, so that the vehicle seat upper part is substantially in a horizontal position.

3. The vehicle seat according to claim 2, wherein the pumping of the fluid is such that during a deflection of the vehicle seat, depending on direction and type of deflection, the fluid is pumped from the first fluid spring element to the second fluid spring element or vice versa, and the pumping of the fluid is prevented during a neutral position of the vehicle seat.

4. The vehicle seat according to claim 1, wherein a first valve element is provided which is arranged parallel to a pump unit, the first valve element being opened during a high-frequency deflection with a large amplitude and otherwise being closed.

5. The vehicle seat according to claim 1, wherein a differential pressure measuring device is provided which is fluidically connected to the first fluid spring element and the second fluid spring element and is arranged parallel to a pump unit, the differential pressure measuring device being provided and configured to detect pressure fluctuations between the first fluid spring element and the second fluid spring element.

6. The vehicle seat according to claim 5, wherein an amount of air which is to be pumped between the first fluid spring element and the second fluid spring element is determined by the differential pressure measuring device.

7. The vehicle seat according to claim 1, wherein a second valve element and a third valve element are provided, the second valve element being fluidically connected to the first fluid spring element and the third valve element being fluidically connected to the second fluid spring element, the second valve element and the third valve element being arranged parallel to one another, and the second valve element and the third valve element being fluidically connected to a compressor unit by a fourth valve element, a fluid being able to be fed into one of the first or second fluid spring element or into both the first and second fluid spring elements or from one of the first or second fluid spring elements or both the first and second fluid spring elements depending on a switching position of the second valve element, the third valve element and the fourth valve element.

8. The vehicle seat according to claim 1, wherein a first sensor is arranged on the vehicle seat upper part and a second sensor is arranged on the vehicle seat lower part, deviations from a horizontal position of the vehicle seat upper part being determined by the first sensor and an amplitude and a frequency of deflection of the vehicle seat being determined by the second sensor.

9. The vehicle seat according to claim 1, wherein the spring element support is rotatably connected about a second axis of rotation to the first scissor arm and rotatably connected about a third axis of rotation to the second scissor arm.

10. A vehicle seat comprising a suspension unit for cushioning rolling and vertical suspension movements of the vehicle seat, wherein the vehicle seat has a vehicle seat upper part and a vehicle seat lower part, wherein the vehicle seat upper part and the vehicle seat lower part are connected by the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a first fluid spring element and a second fluid spring element, wherein the first fluid spring element and the second fluid spring element are each connected to the vehicle seat lower part and to the vehicle seat upper part, wherein a fluid is pumped between the first fluid spring element and the second fluid spring element by a pump unit, so that the vehicle seat upper part remains in a substantially horizontal position during the rolling and vertical suspension movements of the vehicle seat.

11. The vehicle seat according to claim 1, wherein the first axis of rotation is defined by a shaft that is rotatably connected to the vehicle seat lower part, and wherein the shaft includes a first end and a second end, each end rotatably connected to the vehicle seat lower part.

12. The vehicle seat according to claim 11, wherein a first displacement element and a second displacement element are provided, wherein the first scissor arm is rotatably connected to the first displacement element and the second scissor arm is rotatably arranged on the second displacement element, and wherein the first displacement element and the second displacement element are displaceable with respect to the shaft in a direction of the first axis of rotation.

13. The vehicle seat according to claim 1, wherein the rolling movement comprises a rotational movement of the vehicle seat about the first axis of rotation.

14. The vehicle seat according to claim 1, wherein the spring element support is rotatably connected to the first scissor arm and the second scissor arm.

* * * * *

UNITED STATES PATENT AND TRADEMARK OFFICE
CERTIFICATE OF CORRECTION

Page 1 of 1

PATENT NO. : 12,005,821 B2
APPLICATION NO. : 17/118889
DATED : June 11, 2024
INVENTOR(S) : Florian Dotzler and Konstantin Krivenkov It is certified that error appears in the above-identified patent and that said Letters Patent is hereby corrected as shown below:

On the Title Page

After item (54), and in the Specification Column 1 Lines 1-2, the title, please replace "CUSHIONING ROLLING AND VERTICAL SUSPENSION MOVEMENTS" with --VEHICLE SEAT HAVING A SUSPENSION UNIT FOR CUSHIONING ROLLING AND VERTICAL SUSPENSION MOVEMENTS--

Signed and Sealed this
Twentieth Day of August, 2024

Katherine Kelly Vidal
*Director of the United States Patent and Trademark Office*